United States Patent
Fu et al.

(10) Patent No.: US 12,275,164 B2
(45) Date of Patent: Apr. 15, 2025

(54) METHOD FOR SOLVING BRIGHT LINE SCRATCHED DURING LIFTING OF LARGE-SIZE SILICON WAFER

(71) Applicants: GUANGDONG JINWAN GOKIN SOLAR TECHNOLOGY CO., LTD, Guangdong (CN); GOKIN SOLAR CO., LTD, Guangdong (CN)

(72) Inventors: Mingquan Fu, Guangdong (CN); Bing Zhu, Guangdong (CN); Zhiqun Xu, Guangdong (CN); Bin Sun, Guangdong (CN)

(73) Assignees: GUANGDONG JINWAN GOKIN SOLAR TECHNOLOGY CO., LTD, Zhuhai (CN); GOKIN SOLAR CO., LTD, Zhuhai (CN)

( * ) Notice: Subject to any disclaimer, the term of this patent is extended or adjusted under 35 U.S.C. 154(b) by 0 days.

(21) Appl. No.: 18/602,686

(22) Filed: Mar. 12, 2024

(65) Prior Publication Data

US 2024/0217139 A1    Jul. 4, 2024

Related U.S. Application Data

(63) Continuation of application No. PCT/CN2022/117790, filed on Sep. 8, 2022.

(30) Foreign Application Priority Data

Sep. 16, 2021 (CN) .......................... 202111084937.8

(51) Int. Cl.
*B28D 5/00* (2006.01)
*B28D 5/04* (2006.01)

(52) U.S. Cl.
CPC .......... *B28D 5/0076* (2013.01); *B28D 5/045* (2013.01)

(58) Field of Classification Search
CPC ..... Y10T 83/263; Y10T 83/04; B28D 5/0076; B28D 5/045
See application file for complete search history.

(56) References Cited

U.S. PATENT DOCUMENTS

| | | | |
|---|---|---|---|
| 4,955,357 A | 9/1990 | Takeguchi et al. | |
| 6,225,594 B1 * | 5/2001 | Zehavi | H01L 21/67303 118/728 |

(Continued)

FOREIGN PATENT DOCUMENTS

| | | |
|---|---|---|
| CN | 111015983 A | 4/2020 |
| CN | 211467022 U | 9/2020 |

(Continued)

OTHER PUBLICATIONS

International Search Report of PCT/CN2022/117790.

*Primary Examiner* — Phong H Nguyen (57) ABSTRACT

A method for solving a bright line scratched during lifting of a large-size silicon wafer comprises the steps of tooling preparation, crystal bar bonding, lifting preparation, and lifting. By optimizing and adjusting a lifting process, using a hollow plastic board and adding line-cutting fluid during lifting, the line-cutting fluid is attached to a diamond wire saw, which reduces the surface friction of the diamond wire saw, and improves lubricity. Furthermore, by adjusting the lifting process, lifting speeds varies due to different adsorption forces at different positions, so the diamond wire saw is prevented from scratching the surface of the silicon wafer, and the problem of scratching the bright line on the surface of the silicon wafer during lifting of the large-size silicon wafer is solved.

7 Claims, 4 Drawing Sheets

(56) References Cited

U.S. PATENT DOCUMENTS

| | | | | |
|---|---|---|---|---|
| 6,357,432 B2* | 3/2002 | Zehavi | .............. | H01L 21/67306 125/35 |
| 2012/0167733 A1* | 7/2012 | Lee | ...................... | B28D 5/0076 83/169 |

FOREIGN PATENT DOCUMENTS

| | | |
|---|---|---|
| CN | 212578933 U | 2/2021 |
| CN | 113071011 A | 7/2021 |
| CN | 214163582 U | 9/2021 |
| CN | 113752402 A | 12/2021 |
| EP | 0 716 910 A2 | 6/1996 |

* cited by examiner

METHOD FOR SOLVING BRIGHT LINE SCRATCHED DURING LIFTING OF LARGE-SIZE SILICON WAFER

CROSS-REFERENCE TO RELATED APPLICATIONS

This application is a continuation of International Application No. PCT/CN2022/117790, filed on Sep. 8, 2022, which claims priority to Chinese Patent Application No. 202111084937.8, filed on Sep. 16, 2021. All of the aforementioned applications are incorporated herein by reference in their entireties.

TECHNICAL FIELD

The present disclosure relates to the technical field of silicon rod wire cutting processing, and more particularly relates to a method for solving a bright line scratched during the lifting of a large-size silicon wafer.

BACKGROUND

Silicon is an extremely common element, but it rarely appears in the natural world in the form of a simple substance. Instead, it is widely present in rocks, gravel, and dust in the form of complex silicates or silica. The silicon element in the earth's crust accounts for 25.8%, providing an inexhaustible source for the production of monocrystalline silicon. In recent years, large-sized and thinned photovoltaic silicon wafers have become the two main technical directions for cost reduction. With the development of the photovoltaic industry, the trend of thin and large wafers is becoming increasingly mainstream in the industry. At present, large-size wafers are becoming the development trend of the industry in the silicon wafer sector. The increase in silicon wafer sizes can increase the output of battery and module-end production lines, reduce packaging costs, and effectively reduce the production cost per watt, while increasing the power of components.

In the production process of silicon wafers, due to the larger sizes of the silicon wafers, the adsorption force between the silicon wafers increases due to the presence of waste line-cutting fluid between the silicon wafers. In the process of separating the silicon wafers by a diamond wire saw during lifting and retracting, the force of the diamond wire saw acting on the surfaces of the silicon wafers also increases due to the increase of the adsorption force between the silicon wafers, and thus the diamond wire saw causes damage to the surfaces of the silicon wafers, resulting in bright lines on the surfaces of the silicon wafers, which reduces the quality of the silicon wafers and even leads to scrap. To a certain extent, it increases production costs. Therefore, the present disclosure proposes a method for solving a bright line scratched during the lifting of a large-size silicon wafer so as to solve the problems existing in the prior art.

SUMMARY

In view of the above-mentioned problems, the purpose of the present disclosure is to propose a method for solving a bright line scratched during the lifting of a large-size silicon wafer, which increases the lubrication through the optimization and adjustment of a lifting process, the use of a hollow plastic board, and the addition of line-cutting fluid during the lifting. The lubricity reduces the surface friction of a diamond wire saw, thereby solving the problem of scratches during the lifting.

In order to achieve the purpose of the present disclosure, the present disclosure is implemented through the following technical solution: a method for solving a bright line scratched during the lifting of a large-size silicon wafer includes the following steps:

step 1: tooling preparation first selecting, according to the size of a large-size crystal bar to be cut, a hollow plastic board of the corresponding size, through round holes being equidistantly reserved in the hollow plastic board, and then adding line-cutting fluid into a fluid feed device according to the cutting needs, where the number of injection ports provided in the feed device is the same as that of the through round holes reserved in the hollow plastic board;

step 2: crystal bar bonding according to step 1, first bonding an upper surface of the large-size crystal bar to be cut with a lower surface of the hollow plastic board, then bonding an upper surface of the hollow plastic board with a lower surface of a crystal holder, and using a wire cutting machine to drive a diamond wire saw to cut and process the large-size crystal bar rod according to the processing needs;

step 3: lifting preparation according to step 2, when the large-size crystal bar is completely cut through by the diamond wire saw and moved to the position of the through round holes of the hollow plastic board, stopping displacement, then inserting the injection ports of the fluid feed device into the through round holes of the hollow plastic board in a manner of one-to-one correspondence, and injecting the line-cutting fluid into the through round holes of the hollow plastic board through the injection ports by the fluid feed device; and step 4: lifting according to step 3, first setting retracting parameters according to the processing needs, starting a machine to execute the retracting parameters after the line-cutting fluid is completely injected into the through round holes and attached to the diamond wire saw, and gradually removing the large-size crystal bar from a diamond wire saw mesh so as to complete the lifting work.

A further improvement is that: in step 1, the width of the hollow plastic board is equal to that of the large-size crystal bar to be cut, and the through round holes reserved in the hollow plastic board are distributed longitudinally in a penetrating manner.

A further improvement is that: in step 2, the large-size crystal bar to be cut is bonded to the hollow plastic board by means of a two-component adhesive, the hollow plastic board is bonded to the crystal holder by means of the two-component adhesive, and the large-size crystal bar is bonded to the crystal holder by means of the hollow plastic board.

A further improvement is that: in step 3, when the cutting of the diamond wire saw reaches circles of the through round holes of the hollow plastic board, the displacement is stopped, the line-cutting fluid injected into the through round holes firstly covers the diamond wire saw and then flows along a sawed joint cut by the diamond wire saw onto the surface of the silicon wafer, and the line-cutting fluid flow rate is set within a range of 210-230 L/min from lifting to retracting.

A further improvement is that: in step 4, from the beginning of lifting to the part with a distance of 10 mm away from an adhesive surface, the speed of the diamond wire saw is set to 2.5-3.5 m/s, and the feed speed is set to −10 mm/min.

A further improvement is that: in step 4, from lifting to the part with a distance of 10 mm away from the adhesive surface and to the part with a distance of 150 mm away from the adhesive surface, the speed of the diamond wire saw is set to 3.5-4.5 m/s, and the feed speed is set to 60 mm/min.

A further improvement is that: in step 4, from lifting to the part with a distance of 150 mm away from the adhesive surface and to the part with a distance of 60 mm away from a cut surface, the speed of the diamond wire saw is set to 3.5-4.5 m/s, and the feed speed is set to 80 mm/min.

A further improvement is that: in step 4, from lifting to the part with a distance of 60 mm away from the cut surface and to retracting, the speed of the diamond wire saw is set to 2.5-3.5 m/s, and the feed speed is set to 50 mm/min.

The present disclosure has the beneficial effects that by optimizing and adjusting the lifting process, using the hollow plastic board and adding the line-cutting fluid during lifting, the line-cutting fluid is attached to the diamond wire saw, which reduces the surface friction of the diamond wire saw, and improves lubricity. Furthermore, by adjusting the lifting process, lifting speeds varies due to different adsorption forces at different positions, so the diamond wire saw is prevented from scratching the surface of the silicon wafer, and the problem of scratching the bright line on the surface of the silicon wafer during lifting of the large-size silicon wafer is solved. Therefore, the quality of the silicon wafer is guaranteed, scrap is avoided, and the production cost is reduced to a certain extent.

BRIEF DESCRIPTION OF THE DRAWINGS

In order to explain the technical solutions in the embodiments of the present disclosure or in the prior art more clearly, the accompanying drawings required for use in the description of the embodiments or the prior art are briefly described below. Apparently, the accompanying drawings in the following descriptions are only some embodiments of the present disclosure, and those of ordinary skill in the art may further obtain other drawings based on these accompanying drawings without creative efforts.

In figures, 1 denotes a hollow plastic board; 2 denotes through round holes; 3 denotes a diamond wire saw; 4 denotes a large-size crystal bar; 5 denotes a fluid feed device; 6 denotes injection ports; and 7 denotes crystal holder.

DETAILED DESCRIPTION OF THE EMBODIMENTS

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments thereof. Based on the embodiments of the present disclosure, all other embodiments obtained by those of ordinary skill in the art without creative efforts shall fall within the protection scope of the present disclosure.

In the description of the present disclosure, it should be noted that the orientations or positional relationships indicated by the terms "center", "upper", "lower", "left", "right", "vertical", "horizontal", "inner", "outer", and the like are based on the orientations or positional relationships shown in the drawings, and are only for the convenience of describing the present disclosure and simplifying the description, rather than indicating or implying that the means or elements referred to must have a particular orientation, be constructed and operate in a particular orientation, and therefore it should not be understood as a limitation of the present disclosure. In addition, the terms "first", "second", "third", "fourth", and the like are only used for descriptive purposes, and cannot be understood as indicating or implying relative importance.

In the description of the present disclosure, it should be noted that the terms "installed", "connected", and "connection" should be understood in a broad sense unless otherwise clearly specified and defined. For example, it may be a fixed connection, a detachable connection, or an integrated connection; it may be a mechanical connection or an electrical connection; and it may be directly connected, or indirectly connected by means of an intermediate medium, and may be a communication inside the two elements. For those of ordinary skill in the art, the specific meanings of the above terms in the present disclosure can be understood based on specific circumstances.

Embodiment I

Figure 4:
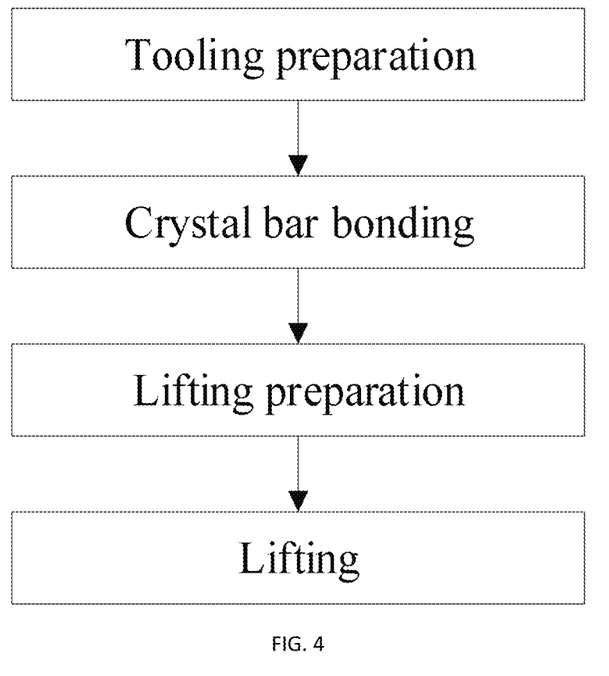
FIG. 4 is a flow chart of a method according to the present disclosure.

Referring to FIG. 4, this embodiment provides a method for solving a bright line scratched during lifting of a large-size silicon wafer, including the following steps:

step 1: tooling preparation first selecting, according to the size of a large-size crystal bar to be cut, a hollow plastic board of the corresponding size, through round holes being equidistantly reserved in the hollow plastic board, and then adding line-cutting fluid into a fluid feed device according to the cutting needs, where the number of injection ports provided in the feed device is the same as that of the through round holes reserved in the hollow plastic board, the width of the hollow plastic board is equal to that of the large-size crystal bar to be cut, and the through round holes reserved in the hollow plastic board are distributed longitudinally in a penetrating manner;

step 2: crystal bar bonding according to step 1, first bonding an upper surface of the large-size crystal bar to be cut with a lower surface of the hollow plastic board, then bonding an upper surface of the hollow plastic board with a lower surface of a crystal holder, and using a wire cutting machine to drive a diamond wire saw to cut and process the large-size crystal bar rod according to the processing needs, where the large-size crystal bar to be cut is bonded to the hollow plastic board by means of a two-component adhesive, the hollow plastic board is bonded to the crystal holder by means of the two-component adhesive, and the large-size crystal bar is bonded to the crystal holder by means of the hollow plastic board;

step 3: lifting preparation according to step 2, when the large-size crystal bar is completely cut through by the diamond wire saw and moved to the position of the through round holes of the hollow plastic board, stopping displacement, then inserting the injection ports of the fluid feed device into the through round holes of the hollow plastic board in a manner of one-to-one correspondence, and injecting the line-cutting fluid into the through round holes of the hollow plastic board through the injection ports by the fluid feed device, where when the cutting of the diamond wire saw reaches circles of the through round holes of the hollow plastic board, the displacement is stopped, the line-cutting fluid injected into the through round holes firstly covers the diamond wire saw and then flows along a sawed joint cut by the diamond wire saw onto the surface of the silicon wafer, and the line-cutting fluid flow rate is set within a range of 210 L/min from lifting to retracting; and step 4: lifting according to step 3, first setting retracting parameters according to the processing needs, starting a machine to execute the retracting parameters after the line-cutting fluid is completely injected into the through round holes and attached to the diamond wire saw, and gradually removing the large-size crystal bar from a diamond wire saw mesh so as to complete the lifting work, where from the beginning of lifting to the part with a distance of 10 mm away from an adhesive surface, the speed of the diamond wire saw is set to 2.5 m/s, and the feed speed is set to −10 mm/min; from lifting to the part with a distance of 10 mm away from the adhesive surface and to the part with a distance of 150 mm away from the adhesive surface, the speed of the diamond wire saw is set to 3.5 m/s, and the feed speed is set to 60 mm/min; from lifting to the part with a distance of 150 mm away from the adhesive surface and to the part with a distance of 60 mm away from a cut surface, the speed of the diamond wire saw is set to 3.5 m/s, and the feed speed is set to 80 mm/min; and from lifting to the part with a distance of 60 mm away from the cut surface and to retracting, the speed of the diamond wire saw is set to 2.5 m/s, and the feed speed is set to 50 mm/min.

Embodiment II

Referring to FIG. 4, this embodiment provides a method for solving a bright line scratched during lifting of a large-size silicon wafer, including the following steps:

step 1: tooling preparation first selecting, according to the size of a large-size crystal bar to be cut, a hollow plastic board of the corresponding size, through round holes being equidistantly reserved in the hollow plastic board, and then adding line-cutting fluid into a fluid feed device according to the cutting needs, where the number of injection ports provided in the feed device is the same as that of the through round holes reserved in the hollow plastic board, the width of the hollow plastic board is equal to that of the large-size crystal bar to be cut, and the through round holes reserved in the hollow plastic board are distributed longitudinally in a penetrating manner;

step 2: crystal bar bonding according to step 1, first bonding an upper surface of the large-size crystal bar to be cut with a lower surface of the hollow plastic board, then bonding an upper surface of the hollow plastic board with a lower surface of a crystal holder, and using a wire cutting machine to drive a diamond wire saw to cut and process the large-size crystal bar rod according to the processing needs, where the large-size crystal bar to be cut is bonded to the hollow plastic board by means of a two-component adhesive, the hollow plastic board is bonded to the crystal holder by means of the two-component adhesive, and the large-size crystal bar is bonded to the crystal holder by means of the hollow plastic board;

step 3: lifting preparation according to step 2, when the large-size crystal bar is completely cut through by the diamond wire saw and moved to the position of the through round holes of the hollow plastic board, stopping displacement, then inserting the injection ports of the fluid feed device into the through round holes of the hollow plastic board in a manner of one-to-one correspondence, and injecting the line-cutting fluid into the through round holes of the hollow plastic board through the injection ports by the fluid feed device, where when the cutting of the diamond wire saw reaches circles of the through round holes of the hollow plastic board, the displacement is stopped, the line-cutting fluid injected into the through round holes firstly covers the diamond wire saw and then flows along a sawed joint cut by the diamond wire saw onto the surface of the silicon wafer, and the line-cutting fluid flow rate is set within a range of 220 L/min from lifting to retracting; and step 4: lifting according to step 3, first setting retracting parameters according to the processing needs, starting a machine to execute the retracting parameters after the line-cutting fluid is completely injected into the through round holes and attached to the diamond wire saw, and gradually removing the large-size crystal bar from a diamond wire saw mesh so as to complete the lifting work, where from the beginning of lifting to the part with a distance of 10 mm away from an adhesive surface, the speed of the diamond wire saw is set to 3 m/s, and the feed speed is set to −10 mm/min; from lifting to the part with a distance of 10 mm away from the adhesive surface and to the part with a distance of 150 mm away from the adhesive surface, the speed of the diamond wire saw is set to 4 m/s, and the feed speed is set to 60 mm/min; from lifting to the part with a distance of 150 mm away from the adhesive surface and to the part with a distance of 60 mm away from a cut surface, the speed of the diamond wire saw is set to 4 m/s, and the feed speed is set to 80 mm/min; and from lifting to the part with a distance of 60 mm away from the cut surface and to retracting, the speed of the diamond wire saw is set to 3 m/s, and the feed speed is set to 50 mm/min.

Embodiment III

Referring to FIG. 4, this embodiment provides a method for solving a bright line scratched during lifting of a large-size silicon wafer, including the following steps:

step 1: tooling preparation first selecting, according to the size of a large-size crystal bar to be cut, a hollow plastic board of the corresponding size, through round holes being equidistantly reserved in the hollow plastic board, and then adding line-cutting fluid into a fluid feed device according to the cutting needs, where the number of injection ports provided in the feed device is the same as that of the through round holes reserved in the hollow plastic board, the width of the hollow plastic board is equal to that of the large-size crystal bar to be cut, and the through round holes reserved in the hollow plastic board are distributed longitudinally in a penetrating manner;

step 2: crystal bar bonding according to step 1, first bonding an upper surface of the large-size crystal bar to be cut with a lower surface of the hollow plastic board, then bonding an upper surface of the hollow plastic board with a lower surface of a crystal holder, and using a wire cutting machine to drive a diamond wire saw to cut and process the large-size crystal bar rod according to the processing needs, where the large-size crystal bar to be cut is bonded to the hollow plastic board by means of a two-component adhesive, the hollow plastic board is bonded to the crystal holder by means of the two-component adhesive, and the large-size crystal bar is bonded to the crystal holder by means of the hollow plastic board;

step 3: lifting preparation according to step 2, when the large-size crystal bar is completely cut through by the diamond wire saw and moved to the position of the through round holes of the hollow plastic board, stopping displacement, then inserting the injection ports of the fluid feed device into the through round holes of the hollow plastic board in a manner of one-to-one correspondence, and injecting the line-cutting fluid into the through round holes of the hollow plastic board through the injection ports by the fluid feed device, where when the cutting of the diamond wire saw reaches circles of the through round holes of the hollow plastic board, the displacement is stopped, the line-cutting fluid injected into the through round holes firstly covers the diamond wire saw and then flows along a sawed joint cut by the diamond wire saw onto the surface of the silicon wafer, and the line-cutting fluid flow rate is set within a range of 230 L/min from lifting to retracting; and step 4: lifting according to step 3, first setting retracting parameters according to the processing needs, starting a machine to execute the retracting parameters after the line-cutting fluid is completely injected into the through round holes and attached to the diamond wire saw, and gradually removing the large-size crystal bar from a diamond wire saw mesh so as to complete the lifting work, where from the beginning of lifting to the part with a distance of 10 mm away from an adhesive surface, the speed of the diamond wire saw is set to 3.5 m/s, and the feed speed is set to −10 mm/min; from lifting to the part with a distance of 10 mm away from the adhesive surface and to the part with a distance of 150 mm away from the adhesive surface, the speed of the diamond wire saw is set to 4.5 m/s, and the feed speed is set to 60 mm/min; from lifting to the part with a distance of 150 mm away from the adhesive surface and to the part with a distance of 60 mm away from a cut surface, the speed of the diamond wire saw is set to 4.5 m/s, and the feed speed is set to 80 mm/min; and from lifting to the part with a distance of 60 mm away from the cut surface and to retracting, the speed of the diamond wire saw is set to 3.5 m/s, and the feed speed is set to 50 mm/min.

Figure 1:
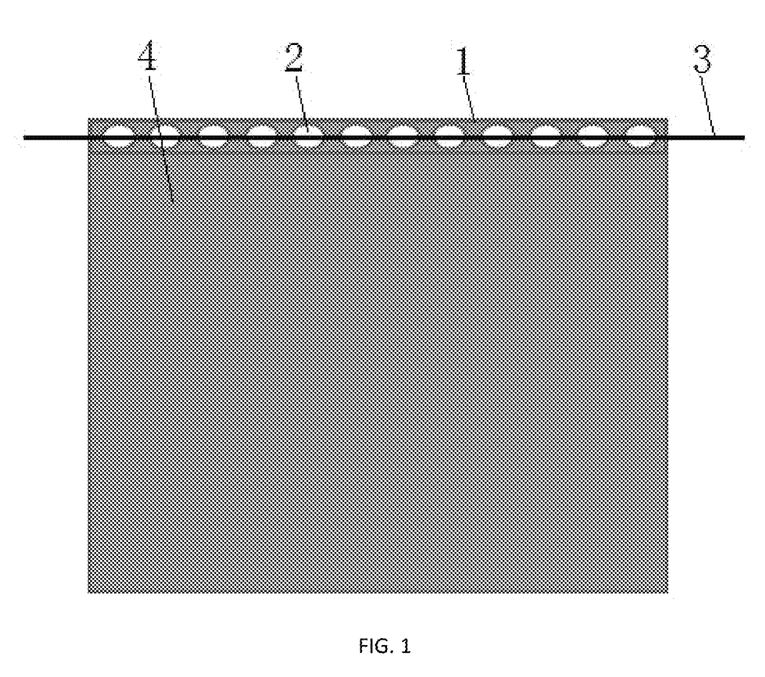
FIG. 1 is a schematic diagram showing the completion of the crystal rod cutting according to the present disclosure.
Figure 2:
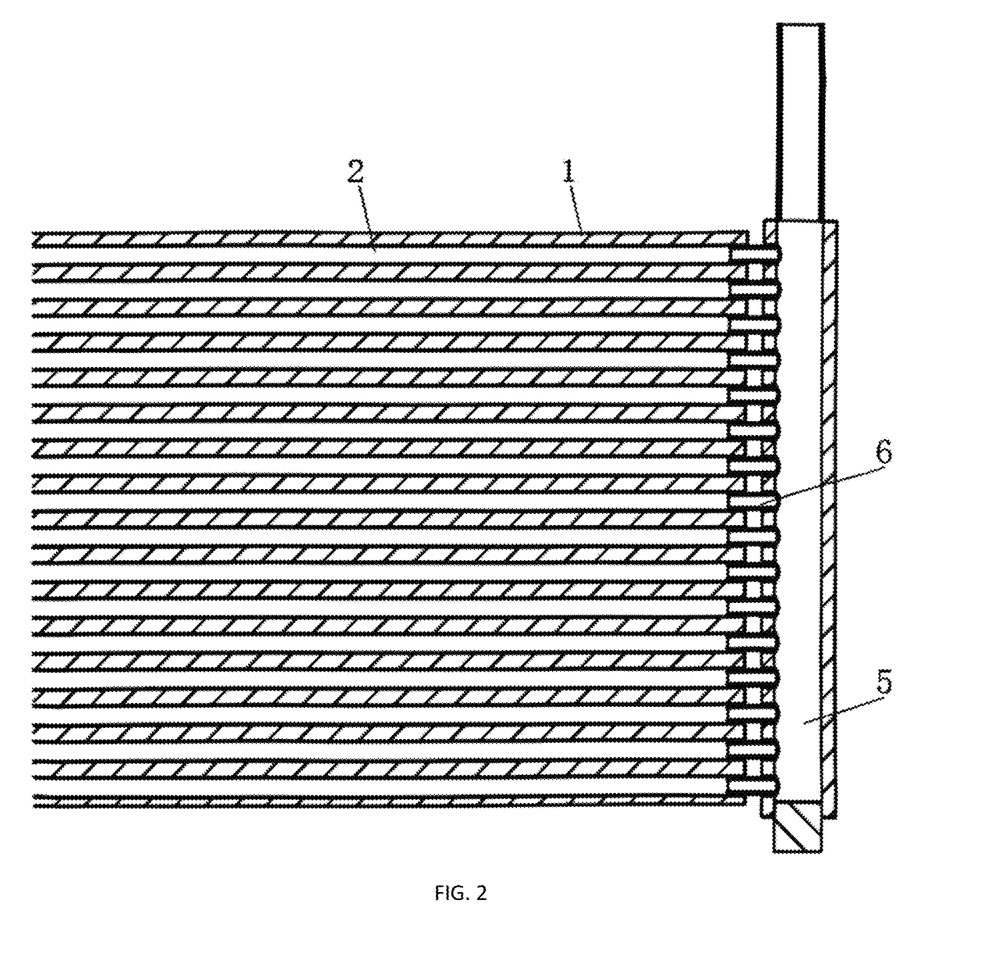
FIG. 2 is a cross-sectional view of a fluid feed device according to the present disclosure.
Figure 3:
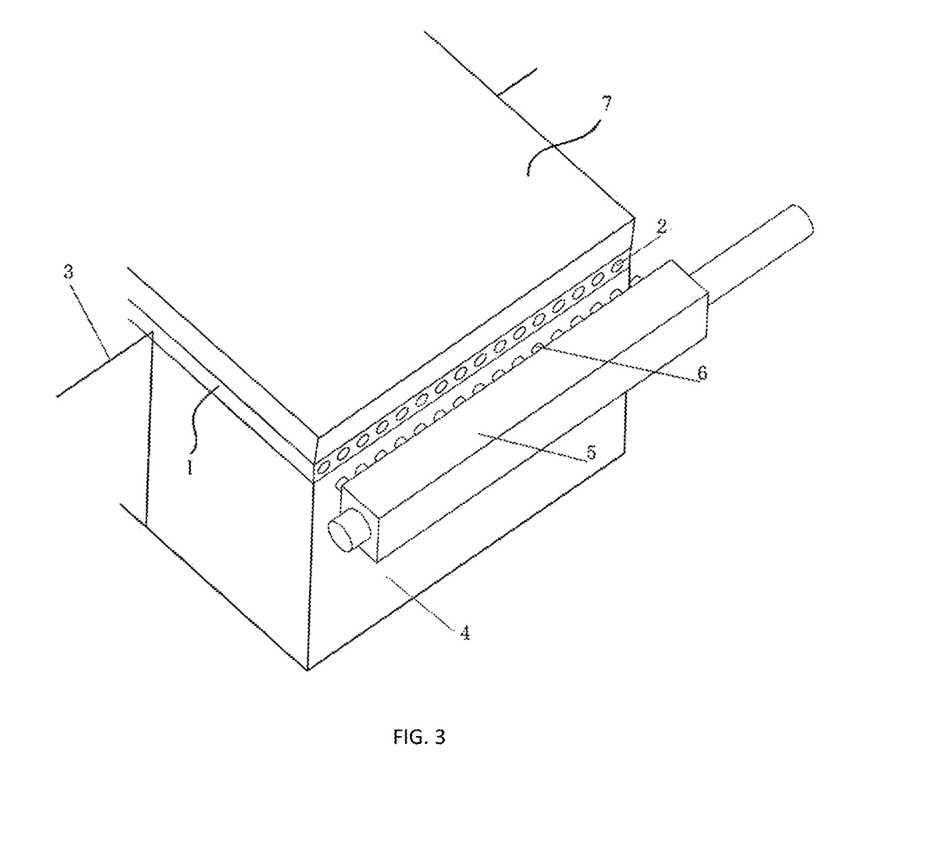
FIG. 3 is a partial enlarged view of the fluid feed device according to the present disclosure.

Refer to FIG. 1, FIG. 2, and FIG. 3, in the figures, 1 denotes a hollow plastic board, 2 denotes through round holes, 3 denotes a diamond wire saw, 4 denotes a large-size crystal bar, 5 denotes a fluid feed device, and 6 denotes injection ports.

The lifting process described in the present disclosure was compared with the existing conventional lifting process for tests. The results are shown in Table 1 below:

TABLE 1

| Item | Scratched bright line (visual observation) | Bright line roughness |
| --- | --- | --- |
| Conventional process | Obviously scratched bright line | 7.35 μm |
| Optimized lifting process | Slightly scratched bright line | 5.42 μm |
| Adding line-cutting fluid and optimizing lifting process | None | 3.37 μm |

The foregoing descriptions are merely exemplary embodiments of the present disclosure, and are not intended to limit the present disclosure. Any modifications, equivalent substitutions, improvement, etc. made within the spirit and principle of the present disclosure shall be included in the protection scope of the present disclosure.

What is claimed is:

1. A method for solving a bright line scratched during lifting of a large-size silicon wafer, comprising:
   tooling preparation:
   first selecting, according to the size of a large-size crystal bar to be cut, a hollow plastic board of the corresponding size, through round holes being equidistantly reserved in the hollow plastic board, and then adding line-cutting fluid into a fluid feed device according to the cutting needs, wherein the number of injection ports provided in the feed device is the same as that of the through round holes reserved in the hollow plastic board; the hollow plastic board is bonded to a crystal holder by adhesive, and the large-size crystal bar is bonded to the crystal holder by the hollow plastic board;
   crystal bar bonding:
   first bonding an upper surface of the large-size crystal bar to be cut with a lower surface of the hollow plastic board, then bonding an upper surface of the hollow plastic board with a lower surface of the crystal holder, and using a wire cutting machine to drive a diamond wire saw to cut and process the large-size crystal bar rod according to the processing needs;
   lifting preparation:
   when the large-size crystal bar is completely cut through by the diamond wire saw and moved to the position of the through round holes of the hollow plastic board, stopping displacement, then inserting the injection ports of the fluid feed device into the through round holes of the hollow plastic board in a manner of one-to-one correspondence, and injecting the line-cutting fluid into the through round holes of the hollow plastic board through the injection ports by the fluid feed device; and
   lifting:
   starting a machine to execute the retracting action after the line-cutting fluid is completely injected into the through round holes and attached to the diamond wire saw, and gradually removing the large-size crystal bar from a diamond wire saw mesh so as to complete the lifting work.

2. The method for solving the bright line scratched during lifting of the large-size silicon wafer according to claim 1, wherein in tooling preparation process, the width of the hollow plastic board is equal to that of the large-size crystal bar to be cut, and the through round holes reserved in the hollow plastic board are distributed longitudinally in a penetrating manner.

3. The method for solving the bright line scratched during lifting of the large-size silicon wafer according to claim 1, wherein in lifting preparation process, when the cutting of the diamond wire saw reaches circles of the through round holes of the hollow plastic board, the displacement is stopped, the line-cutting fluid injected into the through round holes firstly covers the diamond wire saw and then flows along a sawed joint cut by the diamond wire saw onto the surface of the silicon wafer, and the line-cutting fluid flow rate is set within a range of 210-230L/min from lifting to retracting.

4. The method for solving the bright line scratched during lifting of the large-size silicon wafer according to claim 1, wherein in lifting process, from the beginning of lifting to the part with a distance of 10 mm away from an adhesive surface, the speed of the diamond wire saw is set to 2.5-3.5m/s, and the feed speed is set to-10 mm/min.

5. The method for solving the bright line scratched during lifting of the large-size silicon wafer according to claim 1, wherein in lifting process, from lifting to the part with a distance of 10 mm away from the adhesive surface and to the part with a distance of 150 mm away from the adhesive surface, the speed of the diamond wire saw is set to 3.5-4.5m/s, and the feed speed is set to 60 mm/min.

6. The method for solving the bright line scratched during lifting of the large-size silicon wafer according to claim 1, wherein in lifting process, from lifting to the part with a distance of 150 mm away from the adhesive surface and to the part with a distance of 60 mm away from a cut surface, the speed of the diamond wire saw is set to 3.5-4.5m/s, and the feed speed is set to 80 mm/min.

7. The method for solving the bright line scratched during lifting of the large-size silicon wafer according to claim 1, wherein in lifting process, from lifting to the part with a distance of 60 mm away from the cut surface and to retracting, the speed of the diamond wire saw is set to 2.5-3.5m/s, and the feed speed is set to 50 mm/min.

\* \* \* \* \*